Sept. 3, 1963 W. GOLDSMITH 3,102,706
HANGERS FOR PIPE AND THE LIKE
Filed Feb. 23, 1961 2 Sheets-Sheet 1

INVENTOR
William Goldsmith

Sept. 3, 1963 W. GOLDSMITH 3,102,706
HANGERS FOR PIPE AND THE LIKE
Filed Feb. 23, 1961 2 Sheets-Sheet 2

INVENTOR
William Goldsmith

United States Patent Office 3,102,706
Patented Sept. 3, 1963

3,102,706
HANGERS FOR PIPE AND THE LIKE
William Goldsmith, Rosslyn Farms, Pa., assignor to Blaw-Knox Company, Pittsburgh, Pa., a corporation of Delaware
Filed Feb. 23, 1961, Ser. No. 91,092
9 Claims. (Cl. 248—54)

This invention relates broadly to the suspension of pipe lines and more particularly to the hangers used in power piping installations which are subject to deflection due to variation in temperatures, such as steam lines.

It is well known that pipe carrying superheated steam, for example, is subject to substantial deflection during the course of its use and large quantities of spring pipe hangers for supporting such pipe lines are manufactured and sold in a wide range of standard sizes for use in the power, shipbuilding, and chemical industries.

Figure 5:
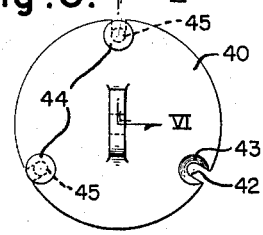

Previous devices have been invented for this purpose, such as, for example, as that described in United States Patent Numbers 2,159,870 and 2,305,048 to Edwin A. Wert. Generally, spring suspension members have been constructed as shown in FIGURE 5 of the latter Wert patent cited above, wherein a compression spring and spring follower is confined in a closed welded tube. A connecting rod with a turnbuckle depends from the spring follower to which it is fastened. The connecting rod is then attached to the pipe to be supported and the welded case is attached to a supporting structure.

Pipe hangers so constructed give satisfactory service but they are expensive to manufacture and the welded construction does not admit of assembly of the hanger from completely finished standard parts. A particular case may be used with different spring members, but since it is assembled by welding, the component parts cannot be finished with the required protective coatings prior to assembly, and the fitting and welding required inherently involves a relatively expensive assembly operation. Thus, the only way of stocking finished parts has been to stock the finished assembled hanger itself. Another problem that arose was that of replacement of components for repair of hangers. The whole hanger had to be replaced by virtue of the fact that the case could not be opened without ruining it.

Applicant's device has solved these problems. Applicant provides a pipe hanger assembled from discrete and completely finished parts which are not welded or otherwise permanently secured to one another comprising an upper frame member including means for attachment to a supporting structure, a lower frame member spaced from the upper frame member, spring means intermediate said frame members and urging them apart, spring follower means intermediate the spring means and upper frame member, a plurality of sockets formed in said frame members adapted to receive tension link members extending between the frame members, a plurality of tension link members having socket fitting portions and extending between sockets in the upper and lower frame members and connecting means fastened to said spring follower means and extending downwardly therefrom for connection to the supported pipe at a point below said lower frame member.

In a preferred embodiment applicant has replaced the welded container with top and bottom plates which have socket forming notches and lugs on them and rectangular tension loops, the ends of which fit into the sockets. This assembly is held together by the compression of the spring, urging the sockets into engagement with the ends of the loops. Thus, the assembly is quite simplified, i.e., the spring is merely depressed between the frames and the loops slipped over the frames into the sockets therein. No fitting or welding is involved and the hangers so constructed may be made with great savings in manufacturing cost. Moreover, the manufacturer may stockpile a wide variety of standard finished parts in readiness for final assembly of hangers of any desired size and capacity. This construction also enables the consumer to replace damaged parts simply and expeditiously without replacing the whole assembly because the consumer can readily disassemble the device without special tools (i.e., he simply depresses the spring by pushing the frames toward each other and slips off the loops) and receive the replacement parts in a minimum of time because the parts can be stockpiled and on hand. An important advantage to the manufacturer was found in that the stockpiled parts may be completely finished including the corrosion resistant finish coating, and need not be refinished after assembly, as was necessary with the welded hanger.

Other details, objects and advantages of the invention will become apparent as the following description of certain present preferred embodiments thereof proceeds.

Figure 1:
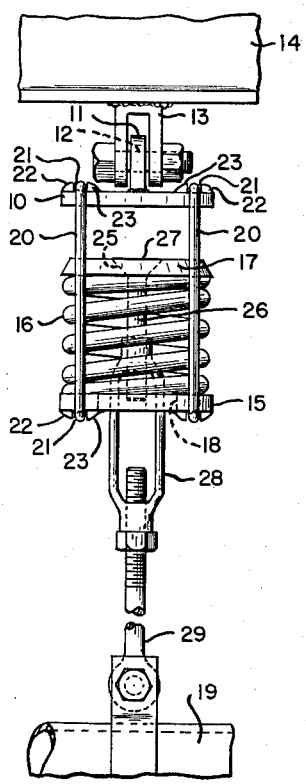
Figure 2:
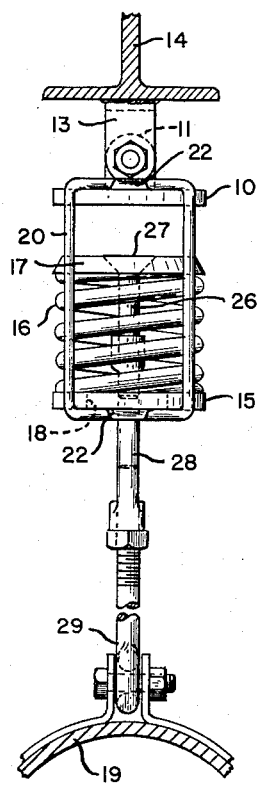
Figure 3:
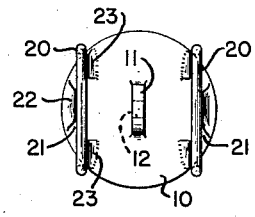
Figure 4:
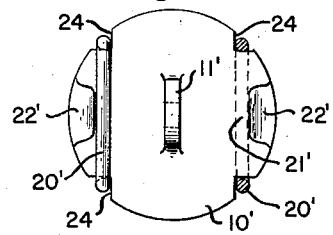
Figure 8:
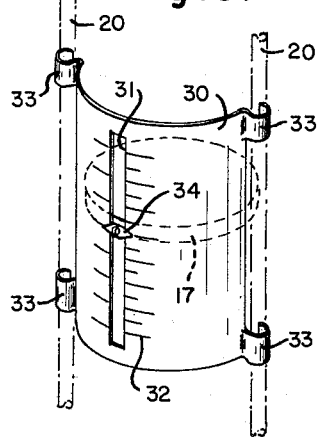
Figure 7:
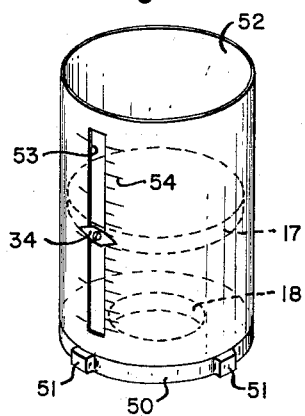
Figure 6:
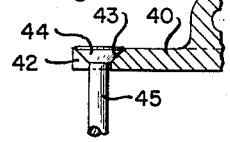
Figure 9:
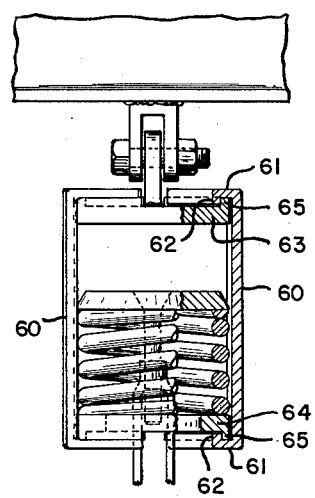
Figure 10:
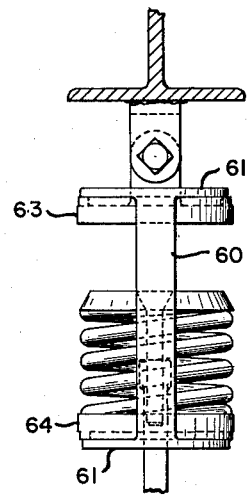
Figure 11:
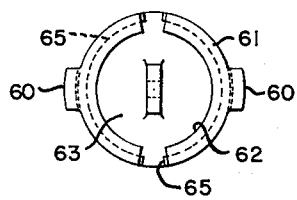
Figure 12:
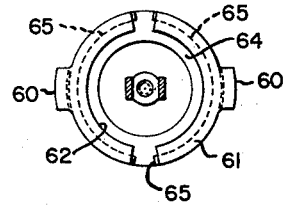

In the accompanying drawings, I have shown certain present preferred embodiments of the invention in which
FIGURE 1 is an elevational view of a hanger device embodying applicant's invention;
FIGURE 2 is a side elevational view of FIGURE 1 taken from the right;
FIGURE 3 is a top plan view of FIGURE 1 with the supporting structure omitted;
FIGURE 4 is a top plan view partly in section of another hanger embodying applicant's invention;
FIGURE 5 is a top plan view with a portion omitted for clarity of still another embodiment of applicant's invention;
FIGURE 6 is a partial sectional view taken on the line VI—VI of FIGURE 5;
FIGURE 7 is an isometric view of an indicator usable with applicant's device;
FIGURE 8 is an isometric view of an indicator scale plate attachable to applicant's device;
FIGURE 9 is an elevational view partly in section of still another embodiment of applicant's invention;
FIGURE 10 is a side elevational view of FIGURE 9 taken from the left;
FIGURE 11 is a top plan view of FIGURE 9 with the supporting structure omitted; and
FIGURE 12 is a bottom plan view of FIGURE 9.

Referring to the drawings and initially to FIGURES 1, 2 and 3, applicant provides an upper frame member 10 having a vertical plate 11 rigidly secured thereto. Plate 11 has a hole 12 therein by which means the hanger may be bolted to a clevis 13 which in turn is fastened to a supporting structure such as beam 14. Applicant further provides a lower frame member 15, a compression spring 16 and a spring follower plate 17. Spring 16 is disposed between frames 10 and 15 and follower 17 is disposed between spring 16 and frame 10. Thus, one end of spring 16 bears directly on frame 15 and the other end of spring 16 bears directly on follower plate 17 which in turn bears directly on frame 10. When the hanger is assembled and not supporting a pipe, spring 16 is partially compressed and, therefore, urges frames 10 and 15 away from each other. The hanger is assembled and held together by rectangular loops 20 the ends of which fit into sockets 21 formed in the outer faces of frames 10 and 15. The hanger is assembled simply by depressing spring 16 between frames 10 and 15 and slipping loops 20 over the ends of the frames into sockets 21. The compression of spring 16 between frames 10 and 15 places loops 20 in a state of tension and thus prevents loops 20 from slipping out of sockets 21. Sockets 21 may be formed a number of ways and I have illustrated several preferred structures for accomplishing this. As shown in FIGURE 1, socket 21 is simply a channel formed by the lugs 22 and 23. Lugs 22 and 23 may be one continuous lug or a series of spaced lugs as shown in FIGURE 3, which is immaterial so long as they form a channel therebetween such as in socket 21 into which the ends of loops 20 may be received. Thus, it is clear, that when the hanger is supporting pipe, as shown in FIGURES 1 and 2, spring 16 is further compressed, pulling down and away from upper frame 10 and bearing harder against lower frame 15, thereby increasing the tension in loops 20 and securing loops 20 in sockets 21 with even greater force. It is also clear that follower 17 is free to move within the confines of loops 20 in response to the movement of pipe 19.

In another preferred embodiment, shown in FIGURE 4, socket 21' is formed by notches 24 in the periphery of frames 10' and 17' (not shown) and lugs 22' which together with notches 24 forms a channel (shown in dotted outline in FIGURE 4) into which the ends of loops 20' may be received. Again it is immaterial whether lugs 22' are a single continuous lug as shown in FIGURE 4, or are simply a series of spaced lugs.

As shown in FIGURES 1 and 2, spring follower plate 17 contains a countersunk hole 25 through which rod 26 passes. Rod 26 has a hemispherical head 27 which seats in hole 25 and swivels therein. A turnbuckle 28 is threaded at one end to the free end of rod 26 and is further threaded at the other end to an attachment such as bracket assembly 29 which is fastened to the supported pipe 19. This assembly depends from follower plate 17 centrally through spring 16 and then through opening 18 in lower frame 15. The arrangement above described in this paragraph is common in such devices and well known by people skilled in the art and no further explanation or description is believed necessary.

Referring now to FIGURE 8, applicant discloses a scale plate 30 with a vertical slot 31 therein and with appropriate scale 32 marked thereon. Scale plate 30 has clips 33 fastened thereto at its corners by which means scale plate 30 may be clipped to tension loops 20 of the hanger. A pointer 34 fastened to follower plate 17 extends through slot 31 and cooperates with scale 32 to indicate the pressure on spring 16. The function and purpose of the above indicating arrangement is fully described in United States Patent No. 2,305,048 to Wert and will not be further described here. Preferably, clips 33 of plate 30 are clipped to the tension rods of opposed loops 20. Thus, if the hanger is subjected to blows lateral or otherwise that occur in some pipe systems, the loops will not fall back out of their sockets when the spring is compressed by such blows, but rather will be held upright in place by virtue of being tied together by plate 30. Of course, this can be accomplished by means other than scale plate 30 and if no scale is desired, then a simple metal band looping around all of rods 20 would suffice.

In another preferred embodiment shown in FIGURES 5 and 6, the tension link members take the form of a "dog bone" instead of a rectangular loop. In this embodiment, upper frame 40 and lower frame 41 (not shown) have at least three notches 42 in their outer peripheries and the outer faces of frames 40 and 41 have been countersunk adjacent notches 42 to form sockets 43 into which the similarly shaped ends 44 of tension rods 45 may be seated. It has been found that three such tension rods 45 will suitably hold the assembly together; however, it is obvious that four or more tension rods 45 with an appropriate number of sockets 43 may be employed equally as well.

FIGURE 7 shows still a further embodiment for use particularly wherein it is deemed desirable to enclose spring 17 associated therewith. In this embodiment lower frame plate 50 has ears 51 formed in its outer periphery so that cannister 52 may be slipped over the top of the assembly to rest on ears 51. Cannister 52 may have a vertical slot 53 therein provided with a conventional scale 54 thereon adjacent slot 53. Pointer 34 fastened to follower plate 17 extends through slot 53 and cooperates with scale 54 to indicate the pressure on spring 16. The cannister serves to confine the tension rods or link members from any outward deflection even when the spring is compressed and thus acts as an auxiliary member to hold the hanger in assembly.

In still another embodiment, as shown in FIGURES 9 through 12, tension link members 60 have curved upper and lower projecting portions 61 with lips 62 at the ends thereof. In this embodiment, upper and lower frame members 63 and 64 have raised portions or ridges 65 on their outer faces over which lips 62 pass and seat against. In this embodiment of my hanger, two tension link members 60 are utilized and as assembled in the hanger function the same as tension loops 20 described earlier. It is obvious, of course, that instead of ridges 65, depressions in the outer faces of frame members 63 and 64 into which lips 62 could seat would be equally suitable and would not be departing from the scope of my invention.

While I have shown and described present preferred embodiments of the invention, it is to be distinctly understood that the invention is not limited thereto, but may be otherwise variously embodied within the scope of the following claims.

I claim:

1. A hanger for supporting pipe and the like comprising an upper frame member including means for attachment to a supporting structure, a lower frame member positioned below the upper frame member in spaced relation therefrom, spring means intermediate said frame members and urging said frame members apart, spring follower means intermediate said spring means and upper frame member, a plurality of sockets formed in said frame members adapted to receive tension link members extending between the frame members, a plurality of tension link members having socket fitting portions and extending between and releasably engaging said sockets in the upper and lower frame members, said socket fitting portions being urged into and maintained in said sockets by the pressure of said spring means upon said frame members whereby the integrity of the hanger is maintained and connecting means fastened to said spring follower means and extending downwardly therefrom for connection to the supported pipe at a point below said lower frame member.

2. A hanger for supporting pipe and the like comprising an upper frame member including means for attachment to a supporting structure, a lower frame member positioned below the upper frame member in spaced relation therefrom, spring means intermediate said frame members and urging said frame members apart, spring follower means intermediate said spring means and upper frame member, spring confining means comprising socket means and tension link members adapted to hold said frame members, spring means and spring follower means together in a state of compression, said socket means comprising a plurality of spaced notches in the periphery of said frame members and a plurality of lug elements disposed on the outer faces of said frame members and spaced intermediate said notches adapted to receive the end portions of the tension link members, a plurality of tension link members extending between sockets in the upper and lower frame members and having socket fitting end portions, said end portions being confined in said notches by said lug elements and the pressure of the spring means on the frame members and connecting means fastened to said spring follower and extending downwardly therefrom for connection to the supported pipe at a point below said lower frame member.

3. A hanger for supporting pipe and the like comprising an upper frame member including means for attachment to a supporting structure, a lower frame member positioned below the upper frame member in spaced relation therefrom, spring means intermediate said frame members and urging said frame members apart, spring follower means intermediate said spring means and upper frame member, a plurality of sockets formed in said frame members adapted to receive tension link members extending between the frame members, each of said sockets comprising a plurality of spaced notches formed in the periphery of said frame members and a plurality of lug elements disposed on the outer face of said frame members intermediate said notches, a plurality of tension link members extending between sockets in the upper and lower frame members and having end portions releasably engaged in said sockets and connecting means fastened to said spring follower and extending downwardly therefrom for connection to the supported pipe at a point below said lower frame member.

4. A hanger for supporting pipe and the like comprising an upper frame member including means for attachment to a supporting structure, a lower frame member positioned below the upper frame member in spaced relation therefrom, spring means intermediate said frame members and urging said frame members apart, spring follower means intermediate said spring means and upper frame member, spring confining means comprising channel means and tension link members adapted to hold said frame members, spring means and spring follower means together in a state of compression, said channel means comprising a plurality of spaced opposed channel forming lug elements on the outer face of said frame members, said tension link members extending between frame members and having end portions adapted to seat in said channels, said end portions being confined in said channels by said lug elements and the pressure of the spring means on the frame members whereby the integrity of the hanger is maintained and connecting means fastened to said spring follower and extending downwardly therefrom for connection to the supported pipe at a point below said lower frame member.

5. A hanger for supporting pipe and the like comprising an upper frame member including means for attachment to a supporting structure, a lower frame member positioned below the upper frame member in spaced relation therefrom, spring means intermediate said frame members and urging said frame members apart, spring follower means intermediate said spring means and upper frame member, spring confining means comprising socket means and tension link members adapted to hold said frame members, spring means and spring follower means together in a state of compression, said socket means comprising a plurality of spaced notches in the periphery of said frame members said frame members having depressions on the outer faces thereof adjacent said spaced notches adapted to receive the end portions of the tension link members, said tension link members extending between sockets in the upper and lower frame members and having end portions adapted to seat in said depressions, said end portions being confined in said depressions by the pressure of said spring means on said frame members whereby the integrity of the hanger is maintained and connecting means fastened to said spring follower and extending downwardly therefrom for connection to the supported pipe at a point below said lower frame member.

6. A hanger for supporting pipe and the like comprising an upper frame member including means for attachment to a supporting structure, a lower frame member positioned below the upper frame member in spaced relation therefrom, spring means intermediate said frame members and urging said frame members apart, spring follower means intermediate said spring means and upper frame member, spring confining means adapted to hold said frame members, spring means and spring follower means together in a state of compression comprising a pair of sockets disposed on opposite sides of the outer faces of each of said frame members and a pair of substantially rectangular tension loop members extending between the frame members and having end portions releasably engaged in said sockets whereby said end portions are confined in said sockets by the pressure of the spring means on the frame members and connecting means fastened to said spring follower means and extending downwardly therefrom for connection to the supported pipe at a point below said lower frame member.

7. A hanger for supporting pipe and the like comprising an upper frame member including means for attachment to a supporting structure, a lower frame member positioned below the upper frame member in spaced relation therefrom, spring means intermediate said frame members and urging said frame members apart, spring follower means intermediate said spring means and upper frame member, tension link members extending between said frame members, said upper and lower frame members having on their outer faces means for releasably engaging and receiving said tension link members which are urged into engagement therewith and there maintained by the pressure of said spring means upon said frame members whereby the integrity of the hanger is maintained and connecting means fastened to said spring follower means and extending downwardly therefrom for connection to the supported pipe at a point below said lower frame member.

8. A hanger for supporting pipe and the like comprising an upper frame member including means for attachment to a supporting structure, a lower frame member positioned below the upper frame member in spaced relation therefrom, spring means intermediate said frame members and urging said frame members apart, spring follower means intermediate said spring means and upper frame member, a plurality of lugs substantially adjacent the periphery of said frame member and forming with the outer faces of said frame members sockets adapted to receive tension link members, said lugs being interposed between the periphery of said frame members and said tension link members, said tension link members being urged into and maintained in said sockets by the pressure of said spring means upon said frame members whereby the integrity of the hanger is maintained and connecting means fastened to said spring follower means and extending downwardly therefrom for connection to the supported pipe at a point below said lower frame member.

9. A hanger for supporting pipe and the like comprising an upper frame member including means for attachment to a supporting structure, a lower frame member positioned below the upper frame member in spaced relation therefrom, spring means intermediate said frame members and urging said frame members apart, spring follower means intermediate said spring means and upper frame member, at least two tension link members having upper and lower portions extending substantially transversely of the outer faces of said frame members, said upper and lower portions having lips extending substantially toward a central portion of the respective link members in releasable engagement with lip receiving means disposed peripherally upon said upper and lower frame members, said lips being urged into engagement with said lip receiving means and there maintained by the pressure of said spring means upon said frame members whereby the integrity of the hanger is maintained and connecting means fastened to said spring follower means and extending downwardly therefrom for connection to the supported pipe at a point below said lower frame member.

References Cited in the file of this patent

UNITED STATES PATENTS

| 1,017,975 | Kenway | Feb. 20, 1912 |
| 1,904,315 | Kenway | Apr. 18, 1933 |

FOREIGN PATENTS

| 535,823 | Great Britain | Apr. 23, 1941 |